| United States Patent [19] | [11] | 3,996,390 |
|---|---|---|
| Igoe | [45] | Dec. 7, 1976 |

[54] ACIDIFIED MILK GEL AND METHOD OF PRODUCING THE SAME

[75] Inventor: Robert S. Igoe, San Diego, Calif.

[73] Assignee: Merck & Co., Inc., Rahway, N.J.

[22] Filed: Oct. 8, 1975

[21] Appl. No.: 620,739

[52] U.S. Cl. .............................. 426/573; 426/576; 426/580; 426/583

[51] Int. Cl.² ...................... A23L 1/04; A23C 23/00

[58] Field of Search .......... 426/573, 580, 584, 599, 426/583, 576

[56] References Cited

UNITED STATES PATENTS

| 3,647,476 | 3/1972 | Swisher ............................. 426/584 |
| 3,692,532 | 9/1972 | Schenkenburg et al. .......... 426/584 |
| 3,914,441 | 10/1975 | Finney et al. ...................... 426/565 |
| 3,917,875 | 11/1975 | Gardiner .......................... 426/573 |

*Primary Examiner*—Jeanette M. Hunter
*Attorney, Agent, or Firm*—Donald J. Perrella; J. Jerome Behan

[57] ABSTRACT

This invention provides for the combination of milk, an acid food juice, sweetening agent, optional acidulent and a thickener comprising gelatin and carboxy methyl cellulose in a palatable, high protein, stable low pH gel. The food juice remains within the product as a finely divided widely dispersed mixture, providing uniformity of flavor without noticeable particles or graininess.

7 Claims, No Drawings

ACIDIFIED MILK GEL AND METHOD OF PRODUCING THE SAME

BACKGROUND OF THE INVENTION

It has long been desired to successfully prepare a food product in which milk and acid food juices, especially fruit juices, were blended to provide valuable nutritional advantages. There are inherent difficulties, however, in combining milk, which has a tendency to curdle with juice having a relatively high acid content. Products which have been produced lack palatability, in many cases have lost essential vitamins, or are devoid of "lasting" qualities so that they deteriorate rapidly.

OBJECTS OF THE INVENTION

Accordingly, it is an object of the present invention to produce a novel milk and acid food juice gel without necessity for chemical neutralizers which will be highly palatable, have a high protein content, a smooth and creamy consistency, have a tender body, a firm moldable texture, and a relatively long life without deterioration. It is further object of this invention to provide a particularly pleasing and nutritious dessert per se. It is another object to provide a novel milk and fruit juice product which may be packaged and distributed through ordinary channels together with the normal commercial distribution and sale of fresh milk or fruit juices. these and other objects of the present invention will become apparent from the following description.

SUMMARY OF THE INVENTION

A method and composition and method are provided for preparing an acidified milk gel product, characterized by smooth body with no graininess and good flavor. The composition comprises a novel thickener system which is a blend of carboxymethyl cellulose and gelatin. The thickener is used at a level of from about 1.5% to about 4% by weight based on the weight of the final total weight of the milk acid food juice system. The two components of the thickener composition are present at levels of from about 7% to about 22% for carboxymethyl cellulose and from about 78% to about 91% for gelatin, all percentages as a percent of total weight of the thickener composition.

DETAILED DESCRIPTION

To achieve the objects of the invention, a novel thickener system is provided which results in the desirable product. This thickener system is a blend of carboxymethyl cellulose having a degree of substitution range from 0.65 to 0.95 (CMC) and type B gelatin. Type B gelatin has an isoelectric point of from about pH 4.7 to about pH 5.1. The thickener composition, as defined above, is used in the final milk-food juice product in an amount between about 1.5% and about 4%, based on weight of the final product. Preferably the milk and food juice constitute about 90% by weight of the final product and preferably are used in approximately equal amounts by weight although either may be present in slight excess amount, i.e., from about 40% to about 50% milk and, correspondingly, from about 50% to about 40% food juice.

The food acidulent may be a food grade acid such as, e.g., fumaric, adipic, citric, tartaric, malic or succinic, either in anhydrous or hydrated state, or a mixture of two or more of the foregoing. Enough food acidulent is added to adjust the pH of the final product to from about 3.8 to about 4.3, preferably to from about 3.9 to about 4.3. The sweetening agent may be a carbohydrate sweetener or an artificial sweetener. The carbohydrate sweetener may be a monosaccharide sugar such as, e.g., fructose or dextrose (glucose) or a disaccharide sugar such as, e.g., sucrose or lactose, or a mixture of two or more sugars. The artificial sweetener may be saccharin, an alkali metal salt or alkaline earth salt of saccharin or a peptide such as L-aspartyl-L-phenylalanine methyl ester.

Suitable food juices are natural fruit juices such as, e.g. orange, grapefruit, black cherry, papaya, mango, grape, cranberry, lemon, lime, or apple, or mixtures of juices such as, e.g., apple and cranberry or lemon and lime or fruit drinks such as grape drink (Welchade) or Hawaiian Punch but this list is non-limiting, and many suitable fruits and juices will occur to those skilled in the art.

Based on dry ingredients before adding the liquid ingredients, i.e. juice and milk, the compositions of the present invention typically contain the following range of ingredients expressed in % by weight, the amounts of ingredients being selected so that the total is 100%:

| Ingredient | % By Weight |
|---|---|
| Gelatin, type B | 15 – 41 |
| CMC | 2.5 – 4 |
| Sugar | 60 – 81 |
| Acidulent | 1.6 – 2.0 |

Typically, the finished product to which the acid food juice and milk have been added contains the following range of ingredients expressed in % by weight, the amounts of ingredients being selected so that the total is 100%:

| Ingredient | % By Weight |
|---|---|
| Gelatin, type B | 1.5 – 4.1 |
| CMC | 0.25 – 0.4 |
| Sugar+ | 6 – 10.0 |
| Acidulent | 1.6 – 2.0 |
| Milk | 40 – 50 |
| Acid food juice | 40 – 50 |

+If an artificial sweetener is used, it is present at a level equivalent in sweetening effect to the sugar. As the weight of artificial sweetener will be much less than that of sugar, the relative amounts of milk and juice will increase.

It is therefore apparent that the focus of this invention is the discovery that an acidified milk-juice gel can be prepared having superior characteristics using a thickener comprising a mixture of carboxymethyl cellulose and type B gelatin. In general, however, at least 0.3% CMC by weight is preferred. Amounts beyond 0.4% by weight may be used but do not confer any advantage.

The chosen amount of each thickener component can be dry mixed together with sugar or artificial sweetener if desired, and added to the milk, followed by addition of the fruit juice. Alternatively, the thickeners can be added separately, first adding carboxymethyl cellulose to the milk, followed by addition of the juice and the gelatin. The final blend is heated.

It is noted that the use of carboxymethyl cellulose as a protein stabilizer has been taught in the literature, see C.A., 56, 1816b; C.A., 78, 83016u. In addition, carboxymethyl cellulose has been used in a milk-fruit juice beverage, see *Food Engineering*, 43, No. 4, April 1971.

Instead of whole milk equally satisfactory results may be obtained by the use of reconsituted non-fat powdered milk or reconstituted condensed milk. Similarly, instead of whole food juices, reconstituted juice like products may be used. Examples of such products are acidified sweetened drinks, e.g. Kool-Aid, or synthetic fruit juice, e.g., Tang, Either the reconstituted product is added to the milk phase, or the dry powder and the requisite amount of water for reconstitution are added to the milk phase.

The following examples illustrate the present invention without, however, limiting the same thereto.

| EXAMPLE | 1 | 2 | 3 | 4 |
|---|---|---|---|---|
| Ingredients | % by Weight | | | |
| Gelatin, type B | 2.0 | 2.0 | 1.5 | 3.0 |
| Carboxymethyl cellulose (7M8SF Hercules) | 0.3 | 0.3 | 0.4 | 0.3 |
| Milk | 45.0 | 45.0 | 45.0 | 45.0 |
| Juice | 45.0 | 45.0 | 45.0 | 45.0 |
| Sugar | 7.5 | 7.5 | 7.9 | 6.5 |
| Citric Acid | 0.2 | 0.2 | 0.2 | 0.2 |

The foregoing compositions are treated as follows to prepare a milk-juice gel according to the present invention.

PROCEDURE

1. Add CMC, blend with half the required sugar, add to milk under agitation, and stir for 15 minutes.
2. Add the food juice acidified with citric acid, if any, to the milk phase, and thoroughly mix until blended.
3. Add gelatin, blend with remaining sugar, add to the juice-milk mixture while stirring.
4. Under continuous stirring, heat to 160° E (71° C.) for 30 minutes.
5. Pour into form and cool to below 40° F (4.4° C.).

What is claimed is:

1. A gelling system for the preparation of an acidified milk gel upon heating consisting essentially of an acid food juice comprising in parts by weight from about 7% to about 22% of carboxymethyl cellulose and from about 78% to about 93% gelatin having an isoelectric point of from about pH 4.7 to about pH 5.1, the percentages based on the total weight of the thickener composition.

2. A gelling system for the preparation of an acidified milk gel upon heating consisting essentially of an acid food juice comprising carboxymethyl cellulose and gelatin having an isoelectric point of from about pH 4.7 to about pH 5.1, the thickener containing from about 5 to about 14 parts of gelatin per part of carboxymethyl cellulose.

3. A composition adapted to be added to milk and juice to form an acidified milk gel consisting essentially of in parts by weight from about 15% to about 41% gelatin having an isoelectric point from about pH 4.7 to about pH 5.1, from about 1.5% to about 4% carboxymethyl cellulose, from about 1.6% to about 2.0% food acidulent, and an amount of sweetening agent effective to impart a sweet taste.

4. A composition according to claim 3 wherein the sweetening agent is from about 60% to about 81% sugar.

5. An acidified milk gel consisting essentially of by weight from about 40% to about 50% acid food juice, from about 40% to about 50% milk, the sum of the percentages of acid food juice and milk being about 90%, from about 1.5% to about 4.1% type B gelatin, from about 0.25% to about 0.4% CMC, from about 1.6% to about 2.0% acidulent, and an amount of sweetening agent effective to impart a pleasant sweet taste.

6. An acidified milk gel according to claim 5 which contains from about 6% to about 10% by weight of sugar.

7. An acidified milk gel according to claim 5 which contains about 45% acid food juice by weight and about 45% milk by weight.

* * * * *